United States Patent [19]

Jackson

[11] Patent Number: 4,802,284

[45] Date of Patent: Feb. 7, 1989

[54] LOCATING DEVICE USED WITH ELECTRICAL OUTLET BOXES AND THE LIKE

[76] Inventor: Christopher A. Jackson, 9771 Acacia Ave., #8, Garden Grove, Calif. 92641

[21] Appl. No.: 17,931

[22] Filed: Feb. 24, 1987

[51] Int. Cl.⁴ .............................................. G01B 5/14
[52] U.S. Cl. ............................... 33/528; 33/DIG. 10; 33/562
[58] Field of Search ................. 33/562, DIG. 10, 613, 33/528

[56] References Cited

U.S. PATENT DOCUMENTS

| | | | |
|---|---|---|---|
| 2,775,812 | 1/1957 | Mohr | 38/DIG. 10 X |
| 4,059,905 | 11/1977 | Wieting | 33/DIG. 10 X |
| 4,202,388 | 5/1980 | Wieting | 33/DIG. 10 X |
| 4,209,103 | 6/1980 | Glovier | 33/DIG. 10 X |

Primary Examiner—Harry N. Haroian
Attorney, Agent, or Firm—Whann & Connors

[57] ABSTRACT

Disclosed is a device for accurately cutting away a section of a panel opposite an electrical outlet box. This device employs a locator plate having two sets of pins, each set extending outwardly from opposite sides of the plate. With the locator plate in position, the panel is placed over the plate with one set of pins piercing the panel. The template is then placed in position with holes in the template servicing to guide the pins piercing the panel and bring the template into registration with the open side of the box so that the center of the template coincides with the center of the open side. With the template in position, the marginal edges of the template overlap the edges of the open side. The user can now use a cutting tool to cut the hole tracing a path defined by the marginal edges of the template. An extension plate is provided for a double outlet electrical box.

2 Claims, 3 Drawing Sheets

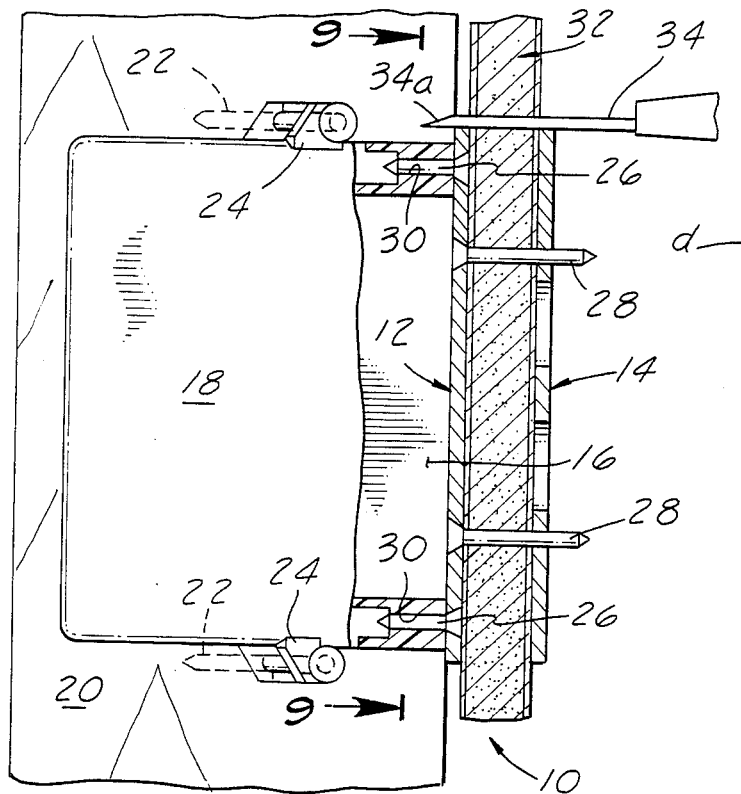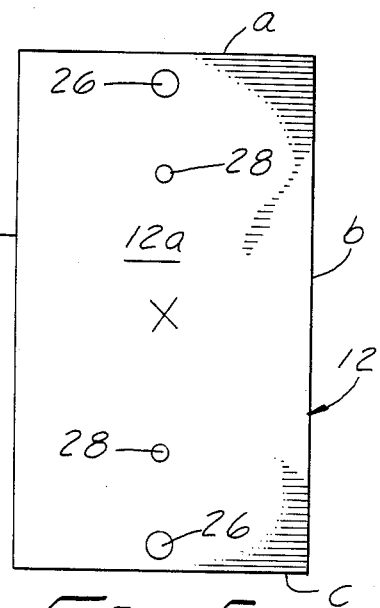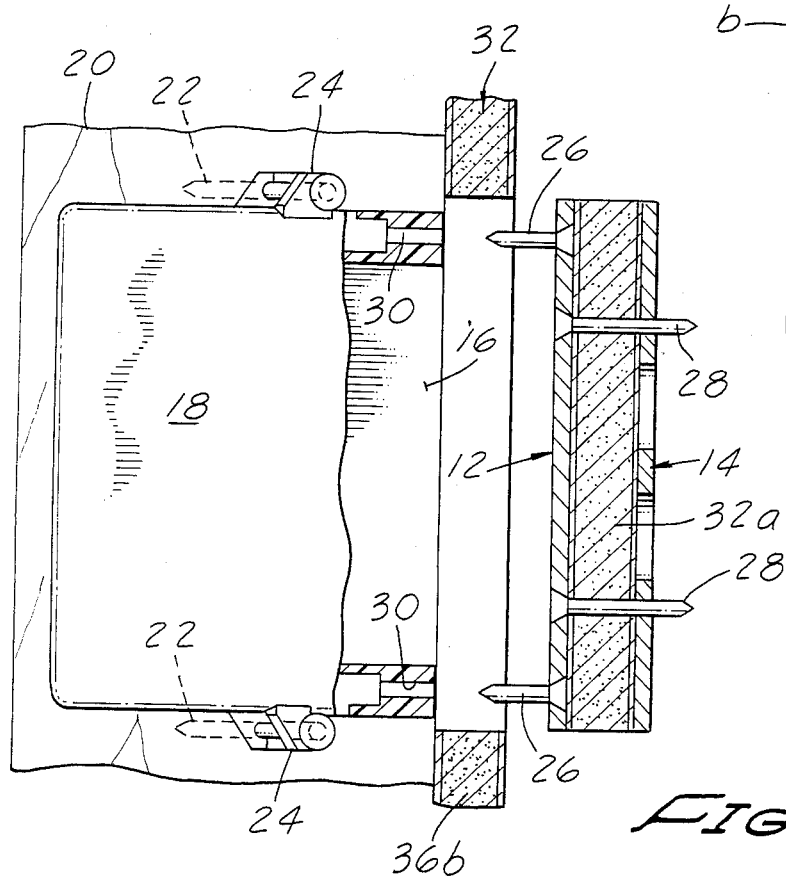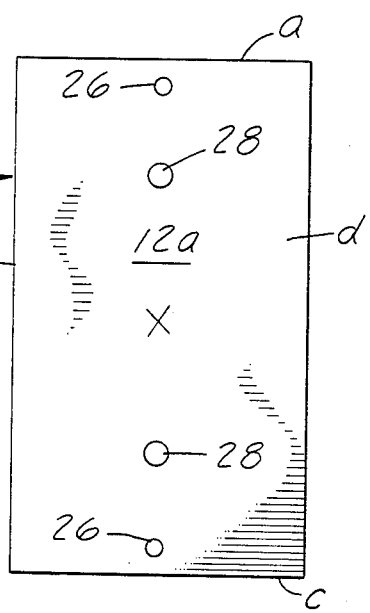

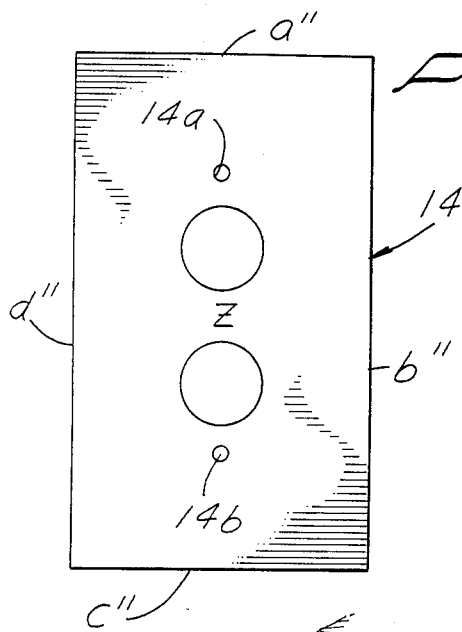
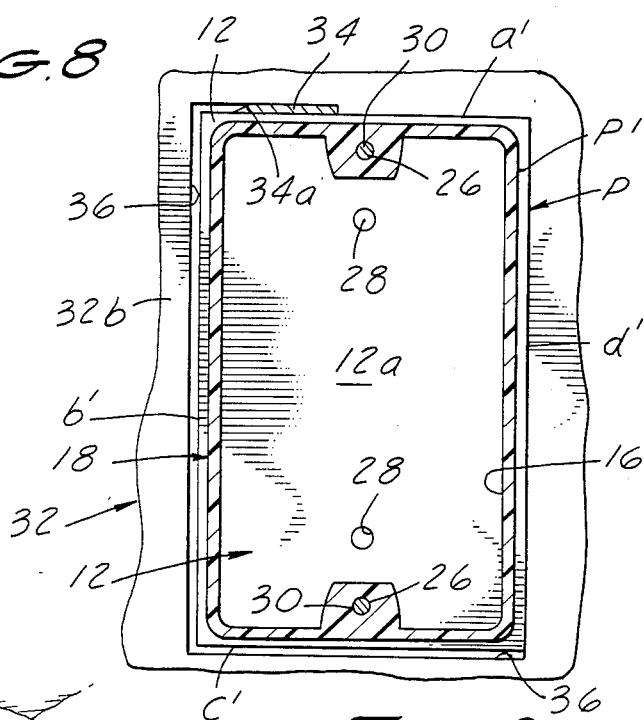
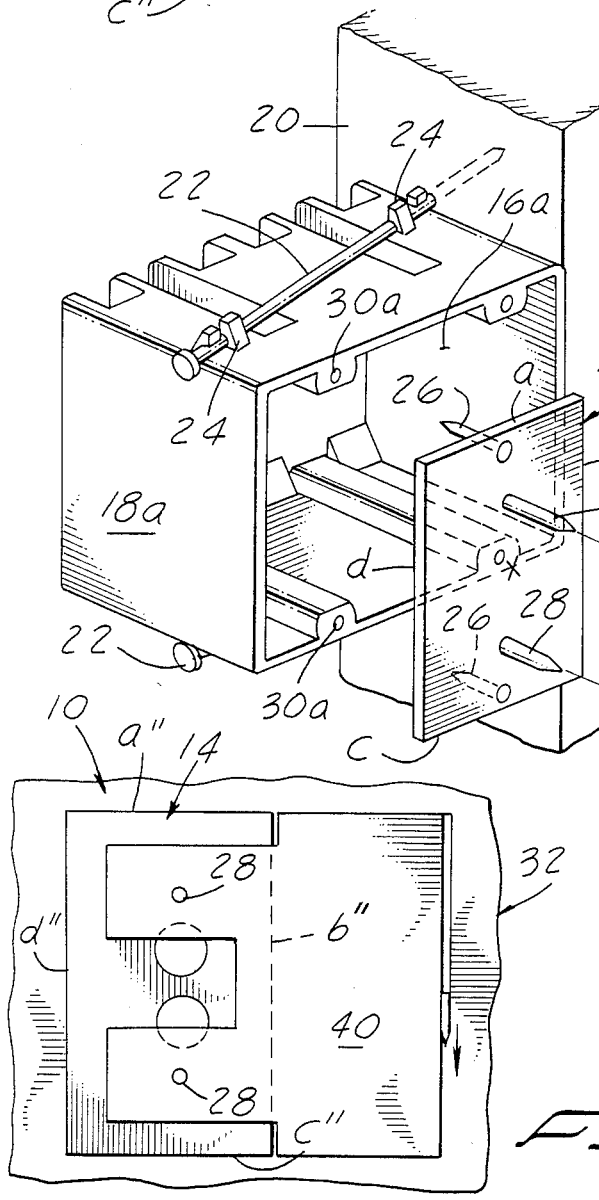
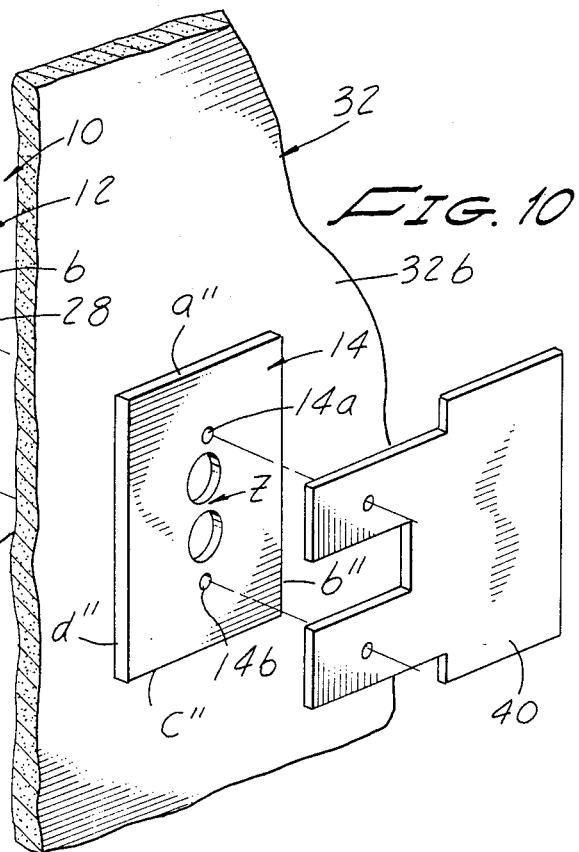

LOCATING DEVICE USED WITH ELECTRICAL OUTLET BOXES AND THE LIKE

BACKGROUND OF THE INVENTION

1. Field of the Invention

This invention relates to a device for locating the open side of an electrical outlet box covered by a panel.

2. Background Discussion

Typical construction methods call for installing panels of sheet rock and the like on wooden studs placed approximately sixteen inches apart. Prior to installation of the panels the electrical wiring is installed with the electrical outlet boxes nailed in the desired position to the wooden studs. It is necessary to cut away sections of the panel to provide access to the open sides of the electrical outlet boxes. This is done prior to installation of the panels. A great deal of skill is necessary in order to quickly and accurately make the necessary measurements and cut away the section panel in the precise location so that the cut away section is in exact registration with the open side of the electrical outlet box upon installation of the panel. In many instances this is not done, leaving a large gap between the perimeter of the open side of the outlet box and the perimeter of the cut away section. Building codes, however, require that the gap between the perimeter of the cut away section and the perimeter of the open side of the outlet box be maintained at a minimum. Oftentimes panels are installed which fail to meet building codes, but the building inspectors frequently overlook these discrepancies because there is not suitable means for doing the job quickly and accurately. In some instances, where this gap is very excessive, a fire hazard is created and results in an unsafe structure.

SUMMARY OF THE INVENTION

The problem discussed above has been eliminated by the present invention which provides a device for quickly and accurately cutting away a panel section so that, when the panel is installed, the cut away section will be in exact registration with the open side of the electrical outlet box. Thus the gap between the perimeter of the cut away section and the perimeter of the open side of the outlet box will be at a minimum and within building cod requirements. The device of this invention is inexpensive to manufacture and easy to use, saving a substantial amount of time in the installation of panels. It is estimated that using the device of this invention in a typical construction environment twice as many panels can be installed by unskilled labor as compared to conventional techniques. Thus substantial cost savings are realized using this invention.

There are several features of this invention, no single one of which is solely responsible for its desirable attributes. Without limiting the scope of this invention as expressed by the claims, its more prominent features will now be discussed. After considering this discussion, and particularly after reading the section of the application entitled DESCRIPTION OF THE PREFERRED EMBODIMENTS, one will understand how the features of this invention provide the ease of panel installation, accuracy of registration, and improved costs savings.

One feature of this device is the use of a locator plate, which, when placed in position over the open side of the outlet box, has overlapping marginal edges which extend slightly beyond the perimeter of the open side of the box. As will be explained in greater detail below, when a cutting tool follows the edge of the locating plate, it cuts away an underlying panel section, with the cut away section having a perimeter just slightly greater than the perimeter of the open side of the outlet box. Thus there is a gap between the perimeter of the open side and the perimeter of the cut away section which is maintained at a minimal and within the building code requirements of the locale where the device is used. Typically, this gap will range between $\frac{1}{8}$ of an inch and 1/16 of an inch.

In accordance with a second feature of this invention the locator plate has two sets of pins: one set extending inwardly toward the open side of the outlet box (the positioning pins) and the other set extending outwardly away from the open side of the outlet box (the template alignment pins). The inwardly projecting set of pins are received in receptacles for the fasteners used to hold the cover of the electrical box in position after the panel has been installed. These positioning pins bring the locator plate into registration with the open side of the outlet box so that the center of the locator plate is coincident with the center of the open side of the box. The set of template alignment pins serve as a guide for a template and also pierce the panel as it is being installed.

A third feature of this invention is the use of a template which has dimensions slightly greater than the open side of the outlet box. Preferably there are holes in the template for receiving the template alignment pins. In accordance with this invention, with the marginal edges of the template aligned with coinciding edges of the open side of the box, the perimeter of the template slightly overlaps the perimeter of the open side. With the locator plate in position covering the open side of the outlet box, the panel is placed in position covering the box. The template alignment pins pierce the panel section which is to be cut away as the panel is moved to cover the box. With the template alignment pins extending through the panel section to be cut away, the template is placed in position on the template alignment pins by slipping the pins through the holes in the template. These holes are positioned so that, when the template alignment pins pass through them, the template will be placed in registration with the open side of the box, with its marginal edges overlapping the marginal edges of the open side.

With the locator plate, panel and template assembled together, the person installing the panel will now be able to cut away the section of the panel overlying the open side of the outlet box. This is accomplished by the use of a simple cutting tool which will pierce the panel with the cutting edge of the tool being guided by the edges of the template. The user simply moves the tool along a path defined by these edges, simultaneously cutting away the section of the panel overlying the open side of the outlet box. When he or she completes tracing a path that follows the perimeter of the template, the cut away section will have been severed from the main body of the panel and can be removed by simply lifting the template and locator plate from the open side. The cut away section of the panel will be sandwiched between the locator plate and the template, with the template alignment pins serving as a site which the user can grasp for removal purposes.

BRIEF DESCRIPTION OF THE DRAWING

The drawing, where like numerals indicate like parts, depicts the different embodiments of this invention, in which:

FIG. 3 is a side elevational view, with sections broken away, showing the template and locator plate in position over the open side of an electrical outlet box and the panel sandwiched between the locator plate and the template.

FIG. 4 is a side elevational view, with sections broken away, showing the cut away section of the panel being removed by simultaneously removing the locator plate and the template.

FIG. 5 is a front plan view of the locator plate.

FIG. 6 is a rear plan view of the locator plate.

FIG. 8 is a plan view of the template.

FIG. 9 is a cross-sectional view taken along line 9—9 of FIG. 3.

FIG. 10 is an exploded perspective view of an alternate embodiment of this invention used with a double size electrical outlet box.

FIG. 11 is a plan view of the embodiment shown in FIG. 10 with the template in position covering the section of the panel to be cut away.

DESCRIPTION OF THE PREFERRED EMBODIMENT

Figure 1:
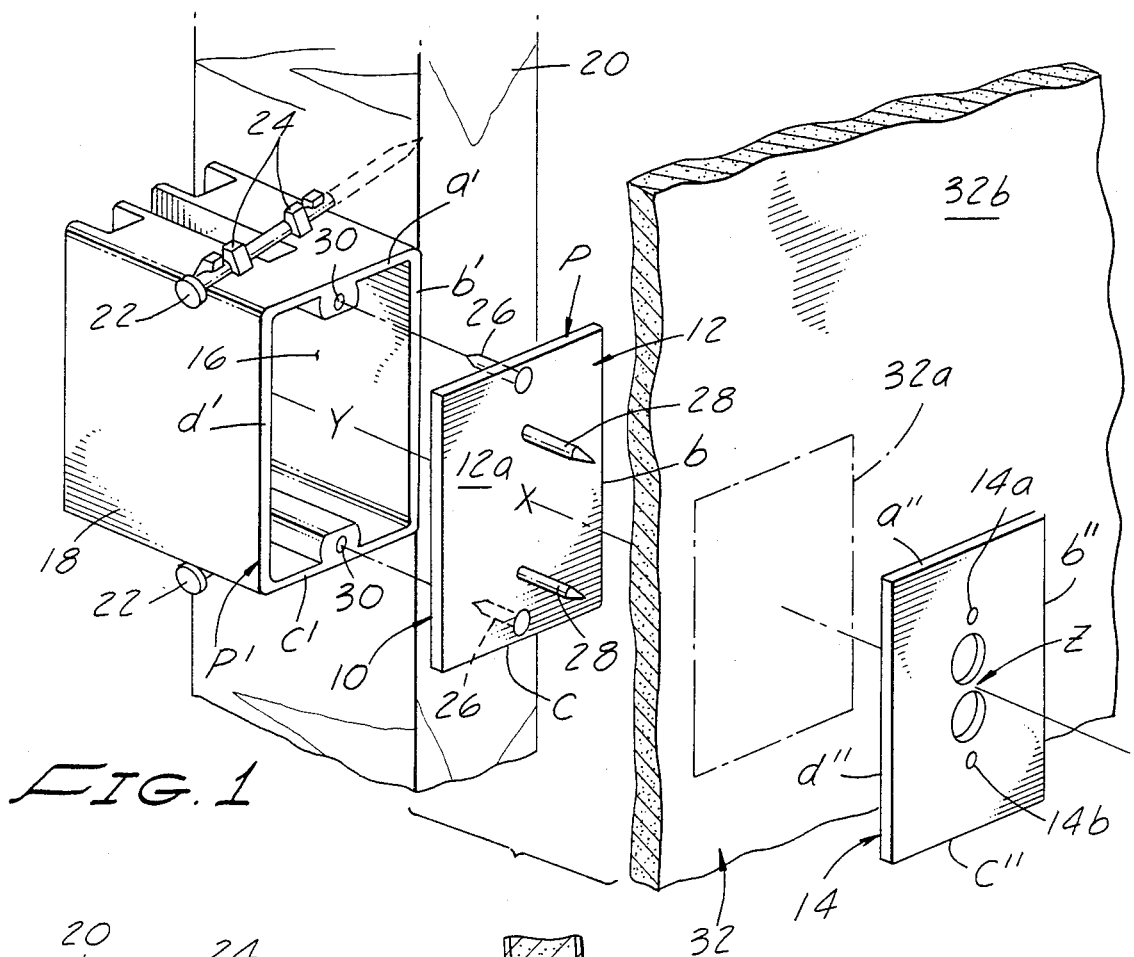
FIG. 1 is an exploded perspective view of the device of this invention being used in the installation of a panel which covers an electrical outlet box.
Figure 7:
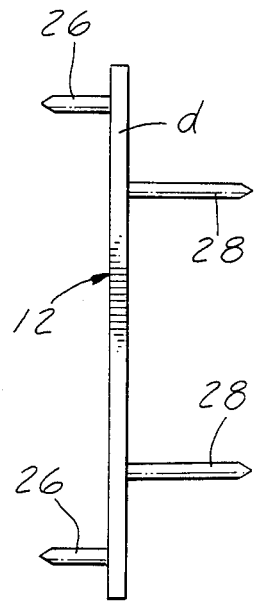
FIG. 7 is a side elevational view of the locator plate.

As best illustrated in FIG. 1, the device 10 of this invention includes a locator plate 12 and a template 14. As shown in FIGS. 5, 6 and 7 the locator plate 12 includes a flat metal member 12a having a configuration which conforms to the configuration of the open side 16 of the electrical outlet box 18. The outlet box 18 is attached to a stud 20 by means of nails 22 which are driven into the stud and guided by nail guides 24 which grip the nails and hold the box 18 in position. The metal member 12a in the example illustrated has a geometrical shape in the form of a rectangle, with each of the four edges a, b, c and d of the member 12a being approximately the same dimensions as the four edges a', b', c' and d' of the open side 16 of the box 18 but slightly greater than these dimensions of the open side.

A pair of positioning pins 26 extend outwardly from the rear side of the locator plate 12 and a pair of template alignment pins 28 extend outwardly from the front side of the locator plate. The positioning pins 26 are adapted to be received in opposed receptacles 30 in the open side 16 of the box 18, and are seated on the inside face of the metal member 12a in a position that will bring the center x of the locator plate 12 coincident with the center y of the open side 16 when the positioning pins are inserted into the receptacles. The receptacles 30 are also used to receive screws (not shown) for holding a cover plate (not shown) in position after panel installation.

When the locator plate 12 is positioned to cover the open side 16 of the electrical outlet box 18, the perimeter p of the plate will overlap the perimeter p' of the open side 16. This overlap distance may, for example, correspond to the maximum gap allowed by the building code of the locale where the electrical outlet box 18 is being installed. Typically this will range between about 1/16 and about ⅛ of an inch.

Figure 2:
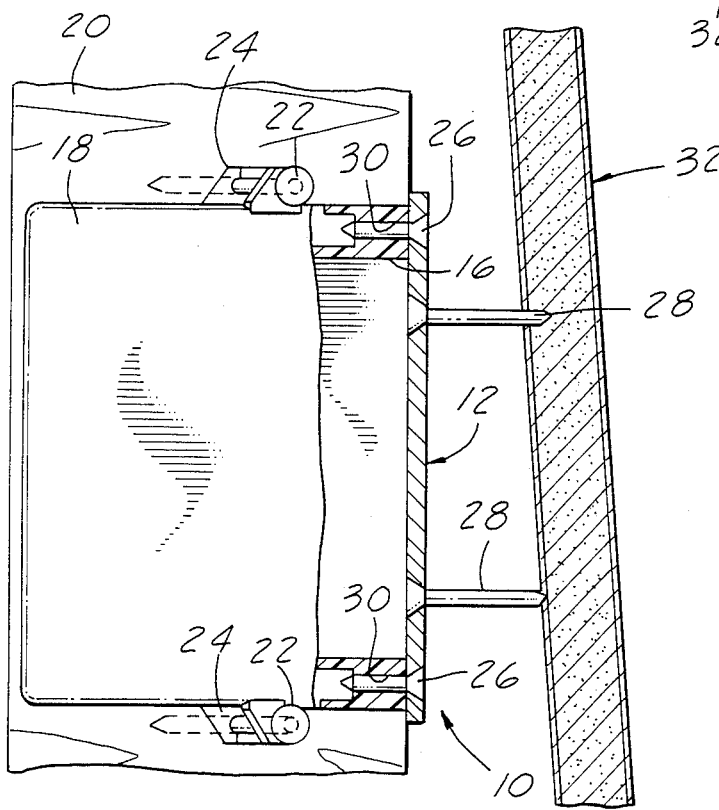
FIG. 2 is a cross-sectional view of the locator plate in position covering the open side of the electrical outlet box shown in FIG. 1 with the panel being moved into position to cover the open side of the outlet box.

As shown in FIG. 2, with the locator plate 12 in position, the template alignment pins 28 extend outwardly and pierce a panel 32 as it is being installed. When the panel 32 is placed in position flush against the front face of the locator plate 12, as illustrated in FIG. 3, the template alignment pins 28 pierce through the panel and extend outwardly therefrom enabling the template 14 to be placed in position in registration with the locator plate.

As shown in FIG. 8, the template 14 is simply a flat metal plate having a pair of holes 14a and 14b spaced apart and located to accommodate the template alignment pins 28 when the template is placed in position. These holes 14a and 14b insure that the marginal edges a", b", c" and d" of the template 14 will be coincident with the marginal edges a, b, c and d of the locator plate 12 and the center z of the template coincident with the center y of the open side 16 of the outlet box 18 and the center x of the locator plate.

As shown in FIGS. 3 and 9, with the locator plate 12 in position covering the open side 16 of the panel 32 sandwiched between the template 14 and the locator plate 12, the user will simply insert a cutting tool 34 through the panel with the cutting edge 34a of the tool abutting the marginal edges a, b, c and d of the locator plate 12 and the marginal edges a", b", c" and d" of the template 14 so that as the user cuts away the section 32a of the panel 32 overlying the open side 16 of the box 18, with these edges guiding the tool. As the tool 34 is moved around these edges, a slot 36 is formed between the main body 32b of the panel and the section 32a of the panel being cut away. When the tool 34 has been moved completely around these edges, the desired panel section removal is completed by simply grasping the ends of the template alignment pins 28 extending through the template 14 and pulling the assembly of the locator plate 12, cut away section 32a of panel, and template 14 away from the open side 16 of the electrical box 18 as illustrated in FIG. 4.

FIGS. 10 and 11 illustrate an alternate embodiment of this invention employing an extension piece 40 which is used when a large electrical box 18a is to be installed. Such electrical box 18a will have an open side 16a which is generally twice the area of the box illustrated in FIG. 1. The same locator plate 12 is employed as illustrated in FIG. 1 with this locator plate positioned in receptacles 30a located to the left side of the enlarged box as viewed in FIG. 10. When the panel 32 is placed in position and the template alignment pins 28 pierce the panel, the template 14 is placed on these pins 28 and then the extension piece 40 is placed over the template as shown in FIG. 11. This combination of extension piece 40 and template 14 will define an area which corresponds to the open side 16a of the enlarged box 18. The cutting tool 34 is then employed to cut away the panel section underlying this area. When the cutting tool has traced a path around this area defined by the edges of the template 14 and the extension piece 40, the sandwich of locator plate, panel cut away section, template and extension piece are removed exposing the interior of the enlarged box.

SCOPE OF THE INVENTION

The above description presents the best mode contemplated for carrying out the present invention as depicted by the two embodiments disclosed. The combination of features illustrated by these embodiments provide the simplicity, precision, and cost savings of this invention. This invention, however, is susceptible to modifications and alternate constructions from the embodiments shown in the drawing and described above. Consequently, it is not the intention to limit it to the particular embodiments disclosed. On the contrary, the intention is to cover all modifications and alternate constructions falling within the scope of this invention as generally expressed by the following claims.

I claim:

1. A device for locating the open sides of either a single outlet or double outlet electrical box during installation of a panel which covers said open sides, including,
   - a locator plate having an inside surface,
   - a pair of outlet alignment pins connected to and extending outwardly from said inside surface which hold the locator plate over the open side of either the single outlet or double outlet electrical box when said locator plate is placed in position prior to installation of the panel,
   - said outlet alignment pin
     - (a) holding the locator plate over open side of a double outlet electrical box with the center of the locator plate displaced with respect to the center of the open side of the double outlet electrical box and the inside surface abutting at least partially the edges of the said open side of the double outlet electrical box, and
     - (b) holding the locator plate over the open side of a single outlet electrical box with the center of the locator plate coinciding with the center of the open side of said single outlet electrical box and the inside surface of the locator plate abutting the edges of said open side of the single outlet electrical box,
   - a pair of template alignment pins connected to and extending outwardly from the locator plate opposite the side from the outlet alignment pins,
   - a template having a pair of openings therein which receive the template alignment pins when the template is assembled with the locator plate, said template serving as a guide for a cutting tool to cut away the section of the panel disposed between the locator plate and the template, and having dimensions of the single outlet electrical box such that, when positioned to overlie the open side of a single outlet and assembled with the locator plate, the center of the template is in registration with the center of the open side of said single outlet electrical box and the perimeter of the template extends slightly beyond the perimeter of said side,
   - an extension plate having a pair of openings therein which receive the template alignment pins when the template is assembled with the extension plate, said extension plate, when assembled with the template, providing a template assembly for a double outlet electrical box that, when positioned to overlie the open side of the double outlet electrical box, provides that the template assembly is in registration with the center of the open side of the double outlet electrical box and the perimeter of the template assembly extends slightly beyond the perimeter of said open side of the double outlet electrical box.

2. The device of claim 1, wherein the template alignment pins are displaced inwardly relative to the outlet alignment pins.

* * * * *